United States Patent [19]
Anderson et al.

[11] Patent Number: 5,383,335
[45] Date of Patent: Jan. 24, 1995

[54] METHOD AND APPARATUS FOR SUPPLYING PRECONDITIONED AIR TO A PARKED AIRCRAFT

[75] Inventors: Gordon K. Anderson, Tustin; Naum Kreymer, Anaheim, both of Calif.; Tom E. Tatham, Ogden, Utah

[73] Assignee: Pneumo Abex Corporation, Ogden, Utah

[21] Appl. No.: 139,223

[22] Filed: Oct. 19, 1993

[51] Int. Cl.⁶ .............................................. F25D 17/06
[52] U.S. Cl. ......................................... 62/89; 62/237; 62/298
[58] Field of Search ................... 62/89, 237, 298, 448, 62/498, 499

[56] References Cited

U.S. PATENT DOCUMENTS

| | | |
|---|---|---|
| 2,494,785 | 1/1950 | Tramontini . |
| 2,495,625 | 1/1950 | Bodinus . |
| 2,585,570 | 2/1952 | Messinger et al. . |
| 2,586,002 | 2/1952 | Carson, Jr. et al. . |
| 2,694,537 | 4/1953 | Reichert . |
| 2,718,766 | 9/1955 | Imperatore et al. . |
| 2,979,916 | 4/1961 | Mason . |
| 3,119,239 | 1/1964 | Sylvan . |
| 3,156,101 | 11/1964 | McGuffey . |
| 3,218,819 | 11/1965 | Crotser . |
| 3,399,545 | 9/1968 | Anderson et al. . |
| 3,415,313 | 12/1968 | Olstad . |
| 3,464,226 | 9/1969 | Kramer . |
| 3,521,460 | 7/1970 | Knowles . |
| 3,587,243 | 6/1971 | Keller et al. . |
| 3,626,704 | 12/1971 | Coe, Jr. . |
| 3,726,100 | 4/1973 | Widakowich . |
| 3,777,506 | 12/1973 | Hergatt et al. . |
| 3,859,816 | 1/1975 | McDonald et al. .................. 62/237 |

FOREIGN PATENT DOCUMENTS

| | | |
|---|---|---|
| 1042686 | 11/1953 | France . |
| 1026985 | 5/1963 | France . |
| 261037 | 8/1949 | Switzerland . |
| 901252 | 8/1962 | United Kingdom . |
| 1385881 | 3/1972 | United Kingdom . |
| 2015723 | 9/1979 | United Kingdom . |
| 2026152 | 1/1980 | United Kingdom . |

OTHER PUBLICATIONS

David Jones/Development of a 1000-W Thermoelectric Air Conditioner Jul. 10, 1989 pp. 232–246.

(List continued on next page.)

*Primary Examiner*—John M. Sollecito
*Attorney, Agent, or Firm*—Trask, Britt & Rossa

[57] ABSTRACT

A method and apparatus for providing preconditioned air to a parked aircraft is disclosed. The apparatus includes a booster unit (10) adapted for association with an existing preconditioned air unit (12). The booster unit (10) includes an auxiliary compressor (112), an auxiliary evaporator (109) and an auxiliary condenser (100 and 100A). These auxiliary elements are interconnected by suitable conduit (114, 115, and 118) and an expansion valve (116). The booster unit (10) is associated with the preconditioned air unit (12) whereby the condenser fan(s) (82 and 84) of that unit is utilized to cool the condenser(s) (100 and 100A) of the booster unit (10). The method includes positioning the booster unit (10) in the air inlet of the preconditioned air unit (12); replacing either the condenser fan(s) (82 and 84) and/or the evaporator blower fan (38) of the preconditioned air unit (12) with a fan (38A or 82A and 84A) having a higher air flow rate capacity; and thereafter drawing air over the auxiliary condenser (100 and 100A) of the booster module (10) by means of the condenser fan (82 and 84 or 82A and 84A) of the preconditioned air unit (12), and also drawing air through the auxiliary evaporator (109) by operation of the P/C air blower fan (38) or (38A).

21 Claims, 6 Drawing Sheets

U.S. PATENT DOCUMENTS

| | | |
|---|---|---|
| 4,038,831 | 8/1977 | Gaudel et al. . |
| 4,051,691 | 10/1977 | Dawkins . |
| 4,251,994 | 2/1981 | Reinhorn . |
| 4,272,967 | 6/1981 | White et al. . |
| 4,297,849 | 11/1981 | Buffet . |
| 4,334,411 | 6/1982 | Payne . |
| 4,352,273 | 10/1982 | Kinsell et al. . |
| 4,357,860 | 11/1982 | Krzak . |
| 4,499,329 | 2/1985 | Benicourt et al. . |
| 4,620,339 | 11/1986 | Shepheard . |
| 4,632,019 | 12/1986 | Whiteman . |
| 4,745,770 | 5/1988 | Mintz . |
| 4,835,977 | 6/1989 | Haglund et al. . |
| 5,031,690 | 7/1991 | Anderson et al. . |

OTHER PUBLICATIONS

Stockholm et al/Thermoelectric Cooling for Naval Applications Mar. 16, 1988 pp. 79–84.

Stockholm et al/Industrial Thermoelectric Cooling in the Kilowatt Range Mar. 12, 1986 pp. 83–89.

Stockholm/Prototype Thermoelectric Air Conditioning of a Passenger Railway Coach Mar. 12, 1984 pp. 136–141.

Stockholm/Large Gas to Gas Thermoelectric Heat Pumps Mar. 12, 1980 pp. 120–125.

Stockholm/Large Scale Thermoelectric Cooling Mar. 22, 1978 pp. 54–59.

Stockholm et al/Naval Thermoelectrics Jul. 10, 1989 pp. 235–246.

R. J. Buist/Design and engineering of thermoelectric cooling devices Sep. 10, 1991 Chapter 16–12 pgs.

S. Gwilliam/Feasibility and prototype developments of a thermoelectric cooler for parked aircraft Sep. 10, 1991 Chapter 41–4 pgs.

Stockholm/Modern Thermoelectric Cooling Technology Mar. 19, 1993 pp. 90–108.

Blanenship et al/Application of Thermoelectric Technology to Naval Submarine Cooling Jul. 10, 1989 pp. 224–231.

TNEE air industrie thermoelectrics/Thermoelectric Air Cooling Equipments with heat rejection to air/Undated/1 pg.

John and Daniel Stockholm/Thermoelectric Modeling of a Cooling Module with Heat Exchangers Oct. 7, 1992 pp. 140–146.

Gwilliam et al/Thermoelectric Air Conditioning Using Evaporative Cooling of Waste Heat Air for Parked Aircraft Oct. 7, 1992 pp. 164–174.

Heenan and Mathiprakasam/Development of Two--Man Thermoelectric Microclimate Conditioner for Use in Army Ground Vehicles Oct. 7, 1992 pp. 181–184.

Air-A-Plane Corp./Air Conditioner/Heater Brochure/Undated/186–194.

Lear Siegler, Inc./Leading the Industry in Ground Support Air Conditioning Systems/Undated/pp. 182–188.

David F. Rider Amraes/Janes Airport Equipment/19-83-84/pp. 179–181.

Melcor Catalog/Frigichip Miniature Ceramic Modules Series FC Jun 1, 1987 48 pgs.

METHOD AND APPARATUS FOR SUPPLYING PRECONDITIONED AIR TO A PARKED AIRCRAFT

BACKGROUND OF THE INVENTION

1. Field of the Invention: This invention relates to apparatus and methods adapted to precondition air for human use, specifically heating and/or cooling air. More specifically, this invention is directed to an apparatus and apparatus for preconditioning air for use in the cabins of parked aircraft.

2. State of the Art: In flight, passenger aircraft rely on on-board systems to provide preconditioned air for their passengers. These systems conventionally rely on the power provided by the operation of the aircraft's main engines or the auxiliary power units engine for their individual operation. Once the aircraft has landed at an airport or similar facility, there exists a continuing need to supply a quantity of preconditioned air to the aircraft, especially during passenger loading and unloading operations.

The continued operation of the aircraft's auxiliary engine in order to provide a source of power for the operation of the preconditioned air systems of parked aircraft results in several negative implications. First, the burning of aircraft fuel while the aircraft is parked on the ground for extended periods has raised environmental concerns in that such burning tends to materially raise the levels of air pollution in the environs of the aircraft. Aircraft engines are not typically fitted with air pollution devices. It follows that the operation of such engines on the ground at a fixed location, especially in an environment wherein several aircraft may be simultaneously assembled may lead to a considerable deterioration in the surrounding air quality.

Secondly, owing to the high cost of such fuels, the burning of jet fuel to provide power for preconditioning of air has been viewed as a very inefficient use of energy resources. Thirdly, the operation of the aircraft's engines for purposes of powering an air preconditioning system leads to premature aging of the engines as a result of the wear and tear which inures from such operation.

In view of the concerns outlined above, recent attention has been focused on the use of preconditioning air systems which rely on power sources other than those available on-board the aircraft. Representative efforts in providing systems which rely on ground based power supplies are those disclosed in the following U.S. Patents: U.S. Pat. No. 4,835,977 (Haglund) issued 6 Jun. 1989; U.S. Pat. No. 5,031,690 (Anderson et al) issued 16 Jul. 1991; U.S. Pat. No. 4,352,273 (Kinsell et al. issued 5 Oct. 1982); and U.S. Pat. No. 2,585,570 (Messinger et al.) issued 12 Feb. 1952 and U.S. Pat. No. 4,272,967 (White) issued 16 Jun. 1981.

While conventional systems have been suggested which utilize ground based power supplies, the continuing problem exists of adapting such systems to the requirements of different sized aircraft. Presently, there exists a multitude of aircraft models and types, each with their own respective passenger carrying capacity and cabin configuration. In large part the cooling requirements for a preconditioned air unit are determined by the number of passengers being housed within the cabin being supplied with preconditioned air, as well as the internal air distribution network and the overall spatial dimensions of the cabin. It follows that a particular precondition air system designed for servicing a given number of passengers and cabin configuration may prove inadequate for servicing an aircraft having a significantly larger passenger capacity and cabin configuration.

Presently, there does not appear to be an apparatus which can be associated with a prior existing preconditioned air system in order to enhance the cooling capacity of that preexisting preconditioned air system to increase that cooling capacity sufficiently to service an aircraft having a larger cooling requirement than that for which the initial preconditioned air system was designed.

There continues to exist a need for an apparatus adapted for enhancing the cooling capacity of a given preconditioned air system which relies on a ground based power supply.

SUMMARY OF THE INVENTION

The instant invention is adapted for use with a preconditioned air unit (hereinafter "P/C air unit") which utilizes vapor cycle refrigeration. Such a P/C air unit will typically include a compressor, an evaporator and a condenser. These structural elements may be interconnected by conduit and appropriate valving to define a refrigeration circuit. A P/C air unit also includes a fan means associated with the condenser for purposes of providing a stream of air over the condenser for withdrawing heat from the condenser and transferring that heat away from the P/C air unit.

The air being supplied to the aircraft cabin to be cooled will be directed from the environment through a passageway or channel fitted with a blower fan adapted to direct a flow of air through the channel. The evaporator is positioned within this channel to provide a means of absorbing heat from the supply air by the refrigerant contained within the conduit thereby cooling the supply air.

An improvement to the present P/C air unit includes a booster module adapted to be associated with the P/C air unit for measurably increasing the cooling capacity of the P/C air unit. The booster module includes a housing defining an auxiliary, air carrying channel. The auxiliary channel is configured to communicate with the environment on a first end of the channel and communicate with an air inlet of the channel of the P/C air unit on its second end. The auxiliary channel thereby provides a means of receiving air from the environment and directing that air through the booster module to the inlet of the P/C air unit. Positioned within the auxiliary channel is an auxiliary evaporator adapted for receiving heat from the air incoming into the auxiliary channel from the environment and transferring that heat to a fluid contained within the auxiliary evaporator.

The booster module housing also includes a auxiliary compressor and a auxiliary condenser. The auxiliary compressor, auxiliary evaporator and auxiliary condenser are interconnected to one another by means of conduit and valving which defines a refrigerant fluid circuit from the compressor to the evaporator and subsequently to the condenser and thereafter returning the refrigerant fluid to the compressor. Notably, the booster module does not contain a fan means for directing a stream of air or other fluid over the evaporator.

The compressor is adapted to receive a supply of power from an external source for its operation. The housing of the booster module is adapted to be associated with the P/C air unit to thereby position the second end of the auxiliary channel in fluid communication with the air inlet of the channel of the P/C air unit. This fluid communication is preferably a sealed communication. The housing is further adapted to permit fluid flow (condenser air) from the environment to pass through the housing of the booster module and thereafter through the auxiliary condenser. This fluid flow then may pass around the auxiliary channel and into the P/C air unit and be exhausted from that unit by the P/C air unit's condenser fans, whereby such fluid flow may pass through the auxiliary condenser for purposes of removing heat from that auxiliary condenser. This fluid flow communication permits the booster module to utilize the fluid flow created by the condenser fan in the P/C air unit as a means of cooling the auxiliary condenser.

It follows that the instant invention provides an auxiliary refrigerant system within the booster module while eliminating the need for a condenser fan in that system.

In one embodiment of the invention, the condenser fan or fans within the P/C air unit are replaced by a condenser fan means whose air flow rate may be adjusted to achieve variable air flow rates. In another alternative embodiment the blower fan in the P/C air unit is replaced with a blower fan means whose air flow is larger than the air flow rate of the previously installed blower fan. In yet another embodiment of the invention, the condenser fan is replaced by a condenser fan means having a variable flow capacity while the blower fan is also replaced by a blower fan of larger capacity.

DETAILED DESCRIPTION OF THE ILLUSTRATED EMBODIMENTS

As shown in FIGS. 1-4 a booster module 10 is detachably mounted on a P/C air unit 12 to increase the cooling capacity of that P/C air unit.

The P/C air unit includes a housing 14 formed by a floor panel 16, a plurality of upstanding side panels 18 and a cover panel 20. Each of the side panels 18 is positioned on the floor panel 16 to be upstanding thereon. Each vertically oriented edge of each side panel is interconnected to the vertically oriented edge of an adjacently positioned side panel 18 to form a polygonal upstanding structure. Cover 20 is positioned atop the sidewalls 18.

The floor panel 16, sidewalls 13 and cover panel 20 in conjunction form a box-like structure which defines a hollow interior space 22. The floor panel 16 defines a pair of apertures 24 which communicate the interior space 22 with the environment and provide a means for air within the space 22 to be expelled to the environment. The P/C air unit will normally include a side panel, positioned opposite panel 18A, which defines an aperture for communicating a plenum 28 with the environment. The aperture provides a means for air from the environment to be introduced through the evaporator 50 into the plenum 28 formed by conduit 30. This sidewall panel may be adapted to be removed from the housing 14 and replaced on the booster unit to thereby constitute sidewall 92C. The sidewall panels 18B and 18C each define an aperture or vent 25 and 27 respectively whereby ambient air may be drawn into the interior 22 of the housing 14.

Figure 1:
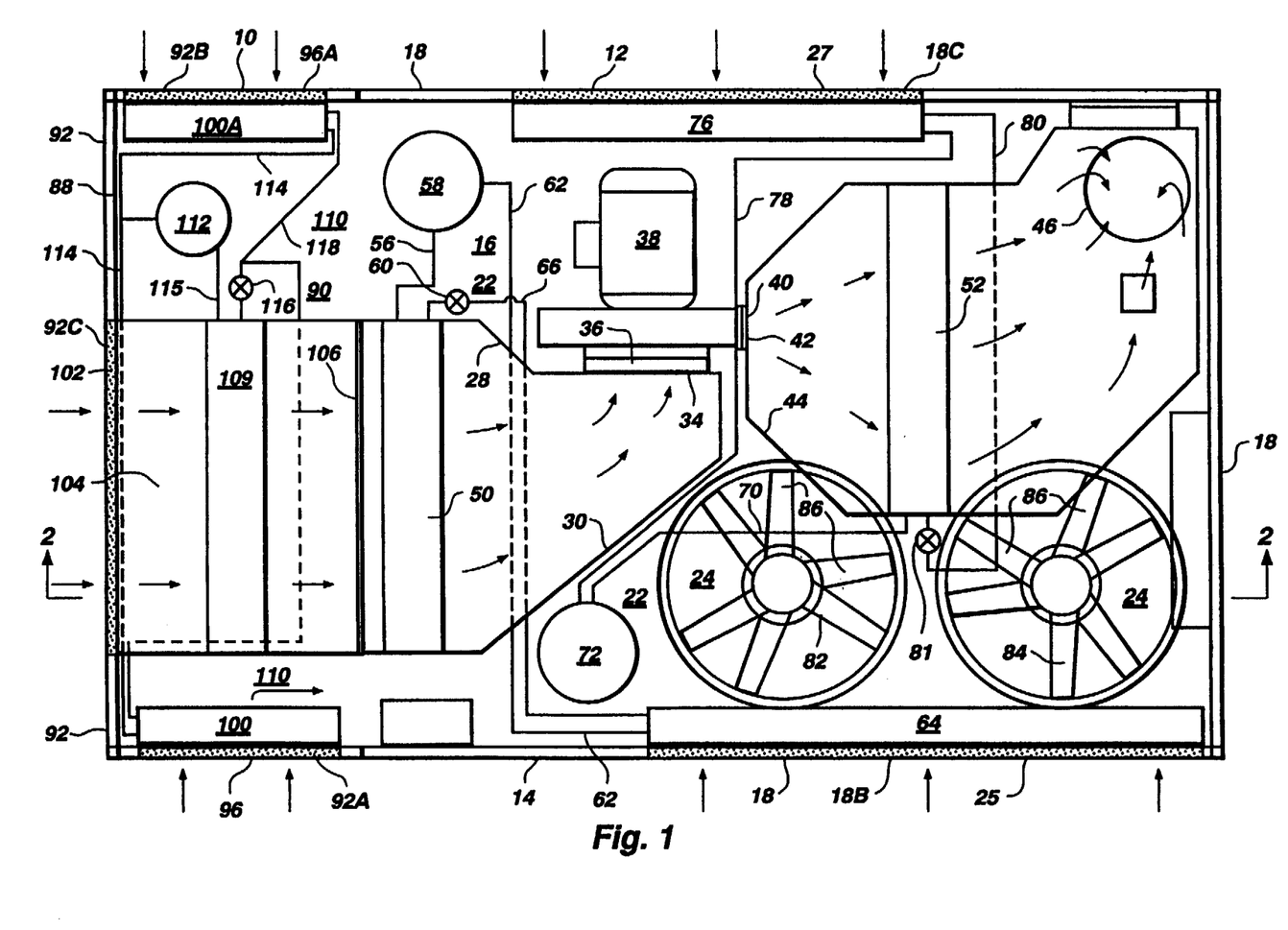
FIG. 1 is a top cut away view of a P/C air unit fitted with a booster module of the instant invention.
Figure 1A:
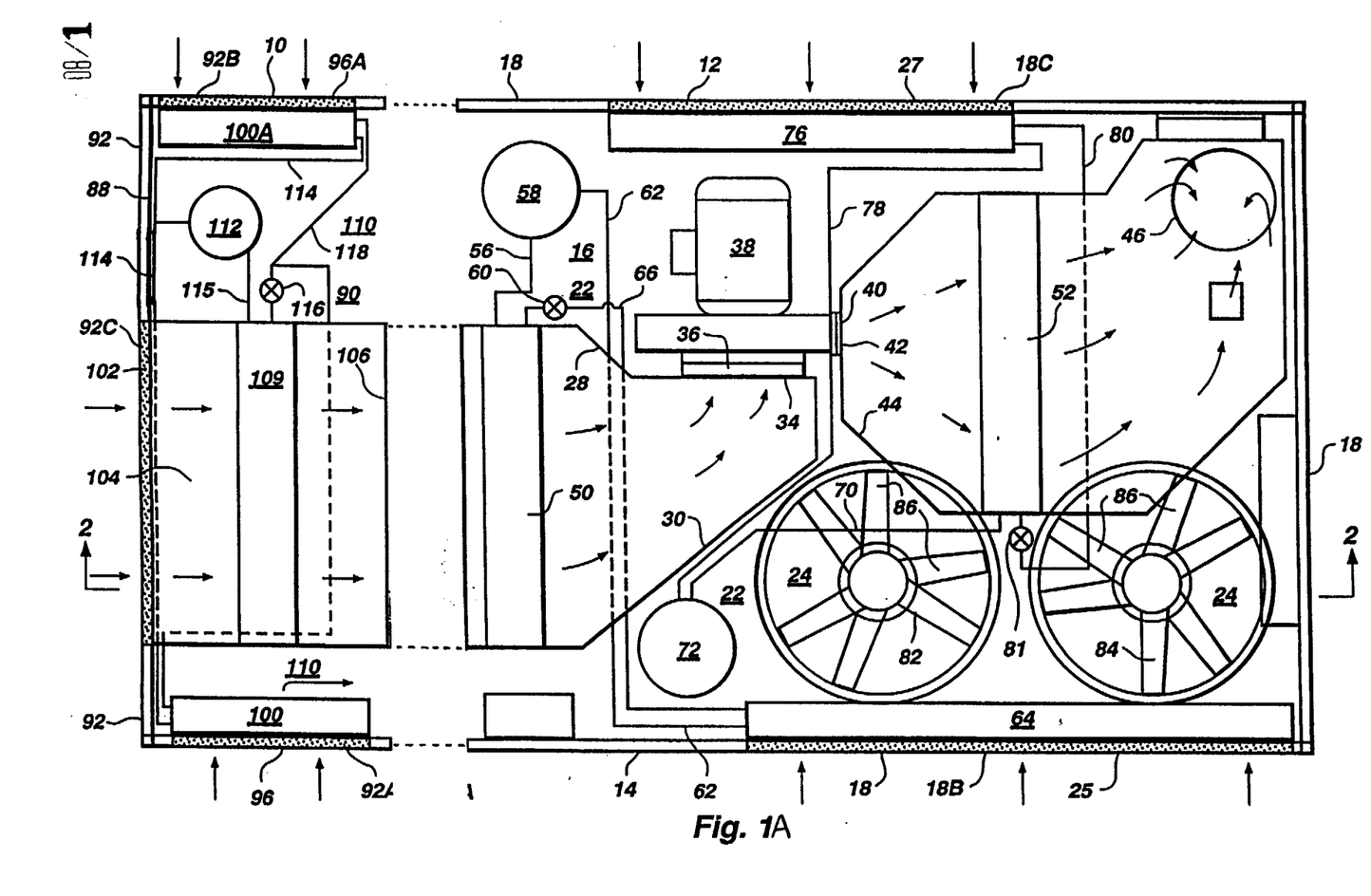
FIG. 1A is an exploded view of the P/C air unit of FIG. 1, showing the booster detached from the P/C air unit.

As shown to advantage in FIG. 1 plenum 28 is disposed within housing 14. Plenum 28 includes an air inlet 32 on its first end. The second end of the plenum 28 defines an outlet 34 which is connected to the inlet 36 of a blower fan 38. The plenum 28 is defined by a sealed conduit 30 which seals the access to the plenum 28 except for the inlet 32 and the outlet 34. Outlet 34 is connected to a blower fan 38. The blower fan 38 is powered by an external power source, e.g. a source of electricity (not shown).

The blower fan 38 is of conventional construction. The inlet 36 of the blower fan 38 is sealed to the second end 28 of the plenum 28 whereby air within the plenum 28 is drawn into the blower fan 38 by the operation of that fan and then subsequently expelled through the fan outlet 40. The fan outlet 40 is sealedly connected to the inlet 42 of a second plenum 44. The second plenum 44 includes an outlet 46. This outlet 46 is fitted with a flexible conduit or hose 48 which is adapted to interconnected with the ventilation system inlet of the aircraft to be serviced. The second plenum 44 is sealed except for its connection to the inlet 42 and its outlet 46.

Figure 5:
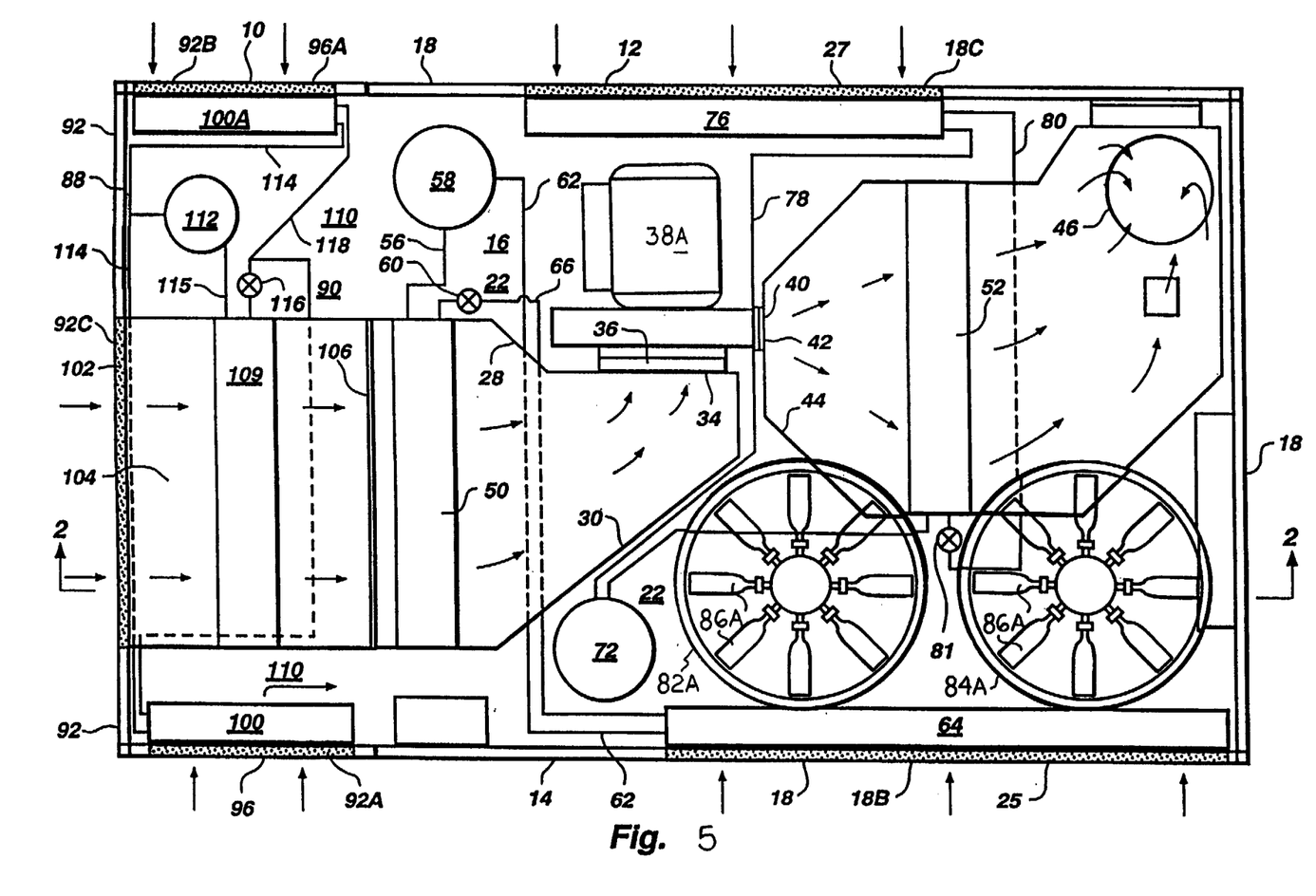
FIG. 5 is a top cut away view of an alternative booster and P/C air unit arrangement of the instant invention.

In some embodiments of the invention the blower fan 38 is replaced by a blower fan 38A having a larger air flow rate capacity as shown in FIG. 5. In those embodiments, the blower fan 38 is mounted within the housing 14 to be detachably removable from that housing. This detachable mounting may include the use of a mounting base plate in association with a plurality of bolts and nuts for securing the base plate to the floor 16 of the housing 14.

Positioned within the plenum 28 is a first evaporator 50. This first evaporator 50 is adapted to convey a flow of refrigerant, e.g. Freon, in a sealed conduit through a portion of the interior of the plenum 28 thereby providing a means whereby heat in the supply air being directed through the plenum 28 may be absorbed by that refrigerant thus cooling the supply air.

A second evaporator 52 is mounted within the second plenum 44 to provide a function similar to that of the first evaporator 50, i.e. to provide a means of transferring heat from the supply air flowing in that plenum 44 to the refrigerant flowing in the second evaporator 52.

The first evaporator 50 is connected by conduit 56 to a first compressor 58. The first compressor 58 is connected by conduit 62 to the first condenser 64. In turn first condenser 64 is connected by conduit 66 to the first evaporator 50. Positioned in the conduit 66 is a first expansion valve 60. The aforesaid conduit in association with the first evaporator 50, first compressor 58 and first condenser 64 define a vapor cycle refrigerant circuit adapted to contain a fluid under pressure and circulate that fluid in a conventional refrigerant cycle.

The second evaporator 52 is mounted within plenum 44 as a means of withdrawing heat from the supply air flowing in the directions indicated in FIG. 1 through plenum 44. This second evaporator 52 is likewise configured to define a sealed fluid flow conduit for a refrigerant fluid. The second evaporator 52 is connected on its first end to a conduit 70 which in turn is connected to a second compressor 72. The second compressor 72 is interconnected to a second condenser 76 by means of a conduit 78. The second condenser 76 in turn is interconnected to one end of the second evaporator 52 by means of a conduit 80. An expansion valve 81 is mounted within conduit 80.

Mounted within the interior space 22 of the housing 14 is a pair of condenser fans 82 and 84. Each of these condenser fans is mounted adjacent to an aperture 24 defined within the floor 16 of housing 14. The condenser fans 82 and 84 are adapted to draw outside air through the apertures 25 and 27 in sidewalls 18B and 18C thereby passing that outside air over the surfaces of the first and second condensers 64 and 76. The outside air is thereafter directed through the interior 22 of housing 14 eventually being expelled by the condenser fans through the apertures 24.

Each of the condenser fans 82 and 84 are illustrated as being fitted with fan blades 86. In one embodiment of the invention, as shown in FIG. 5, the condenser fans 82 and 84 are removed from the housing 14 and are replaced with condenser fans 82A and 84A. Condenser fans 82A and 84A are fitted with variably adjustable blades 86A. Such fans are commercially available under the trademark MULTI-WING from Crowley Company, Inc. The adjustable blade condenser fans are adapted to permit the user to adjust the air flow rate of the fans by altering the pitch of the vane blades of the fan.

Figure 4:
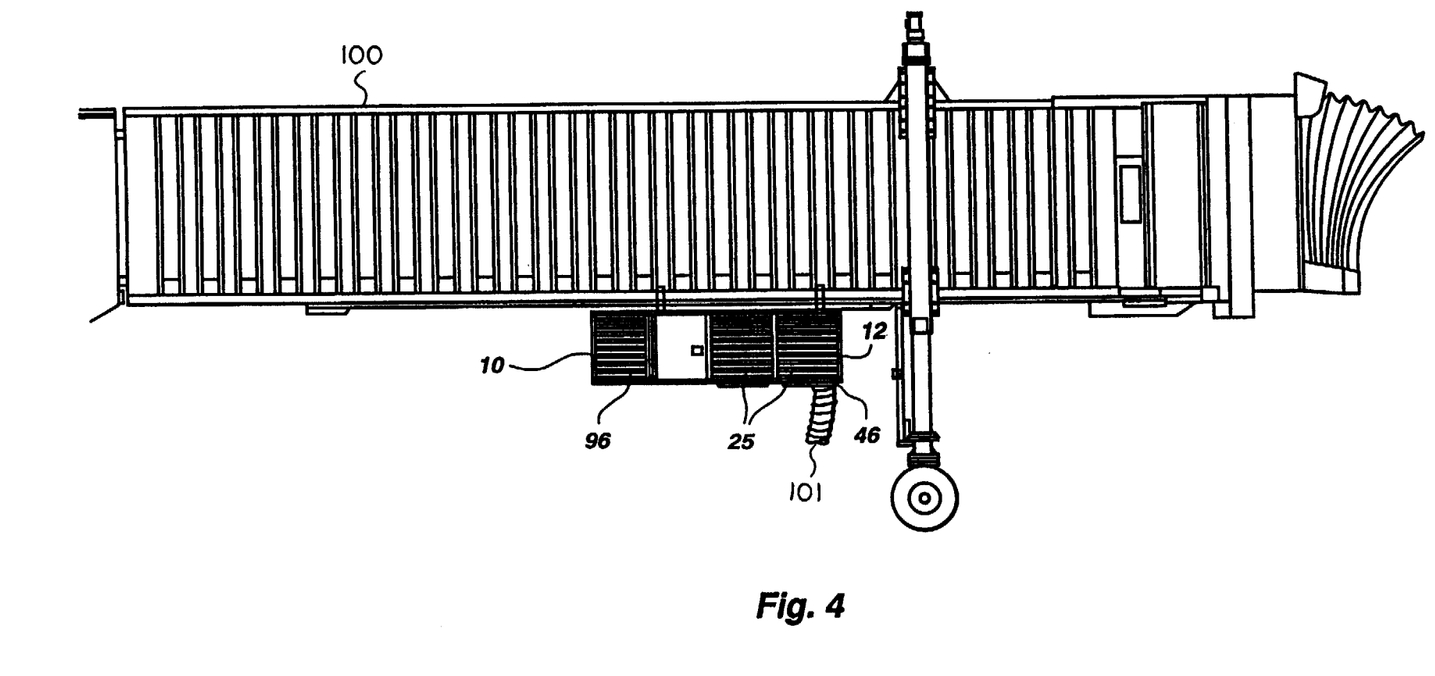
FIG. 4 is a side view of an aircraft loading bridge fitted with a P/C air unit in association with a booster unit of the instant invention.

The booster module 10 includes a housing 88 which is formed by a floor panel 90, a plurality of end panels 92 and a cover panel 94. As shown in FIG. 4, floor panel 90 is a flat, solid, planar panel. Each of the sidewalls 92A and 92B as shown in FIG. 1 defines a vent or aperture 96 and 96A which is adapted to permit the entry of ambient air into the interior of the housing 88. More specifically, vent 96 facilitates the passage of ambient air into the housing 88 and over an auxiliary condenser 100 positioned proximate sidewall 92A.

Likewise, the opposing sidewall 92B also defines a vent 96A therein which similarly facilitates the entry of ambient air into the housing 88 for purposes of cooling an condenser 100A positioned proximate the sidewall 92B. End panel 92C also defines a vent or aperture 102 therein. Vent 102 communicates with the inlet of a plenum 104 positioned within housing 88. As noted above in preferred embodiments the sidewall of the P/C air unit may be removed from that unit and be utilized to form side panel 92C. It follows that in this arrangement, the aperture or vent of that sidewall would form the vent/aperture 102.

The housing 10 is adapted to be releasably secured to the P/C air unit proximate the location of the sidewall as shown in FIG. 1. To facilitate the installation of the booster module 10 the module is fitted with a plurality of brackets 105, one of which is illustrated in FIG. 2, which are adapted to temporarily secure the module to the P/C air unit until the module is securely attached to the P/C air unit, for example, by bolts and nuts or other similar attachment system.

Figure 2:
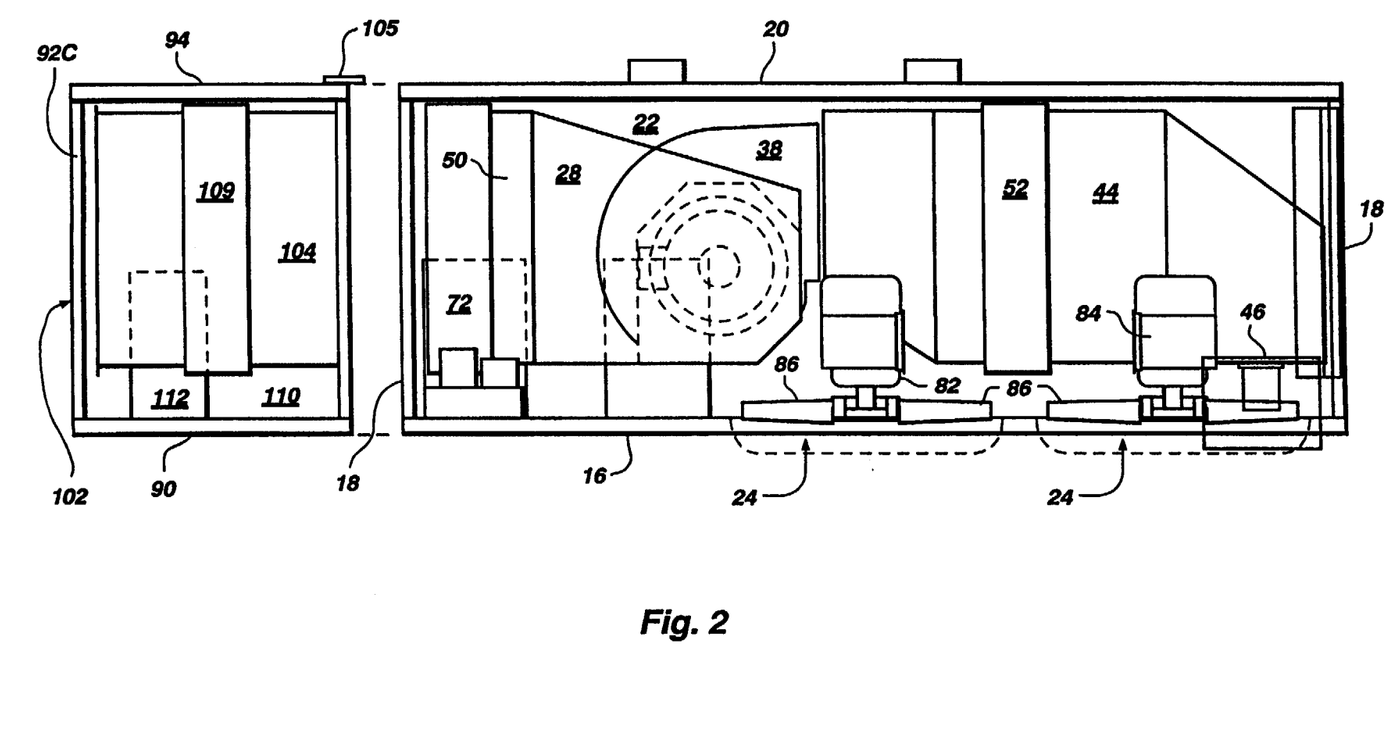
FIG. 2 is a cross sectional side view of the structures illustrated in FIG. 1, taken along section lines 2—2 wherein the booster unit has been separated from the P/C air unit for clarity purposes.
Figure 3:
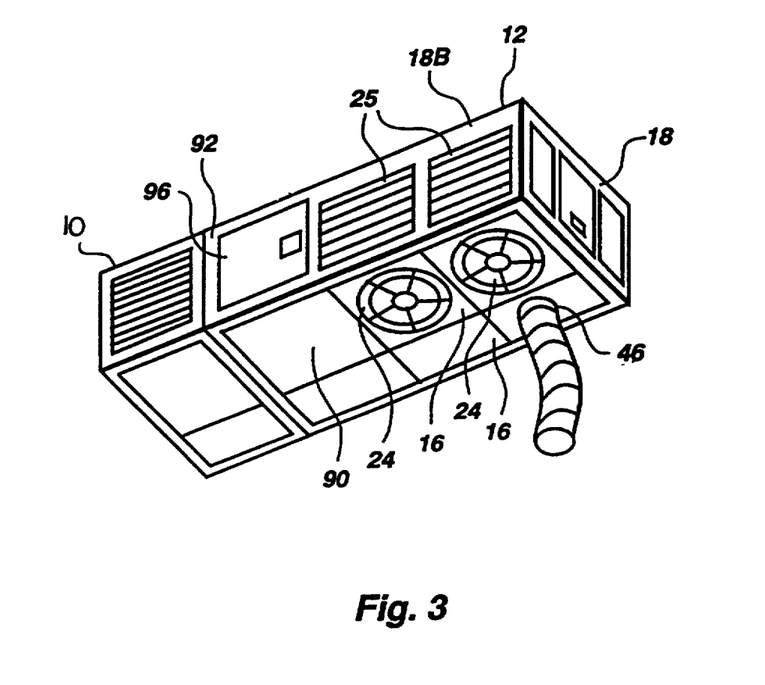
FIG. 3 is a bottom view of a P/C air unit fitted with a booster unit of the invention.

As shown in FIGS. 1-2, the booster 10 includes a plenum 104 positioned therein which communicates on its first end with the vent 102. The plenum 104 communicates on its opposing end with the air inlet of the plenum 28. In preferred constructions a gasket or seal 106 is interposed between the air inlet of the plenum 28 and the second end of plenum 104. The seal 106 is adapted to seal the connection of the two plenums and thereby isolate the air flowing within those plenums from contact with air which is found within the two housings external to those plenums. With the connection of the two plenums 104 and 28 a clear air passage is established between the vent 102 through plenum 104 thereafter through plenum 28 and into blower fan 38. The air is subsequently driven through plenum 44 and then through the outlet 46 of plenum 44.

The booster module utilizes the operation of the blower fan 38 of the P/C air unit to induce or drive a stream of supply air through the plenum 104. In effect the particular construction of the booster module eliminates the necessity of providing its own blower fan by utilizing the blower fan 38.

The interior of housing 10 defines an hollow interior space 110 which surrounds the exterior of plenum 104. This hollow interior communicates with the hollow interior 22 of housing 12. In preferred embodiments, the housings 10 and 12 are constructed to permit an uninterrupted communication of interior spaces 110 and 22. This communication permits the condenser fans 82 and 84 to draw air through the vents 96 and 96A as a result of the operation of the condenser fans. The resulting air flow passes over the surface of the condensers 100 and 100A cooling those condensers. In essence the booster is able to utilize the operation of the condenser fans of the P/C air unit to cool the auxiliary condensers 100 and 100A and thus eliminates the necessity of providing a condenser fan within the booster module itself.

An auxiliary evaporator 109 is mounted within plenum 104. This auxiliary evaporator 109 is connected to an auxiliary compressor 112 mounted in the housing 10 of the booster module by conduit 115. The auxiliary compressor 112 is connected to the auxiliary condensers 100 and 100A by a conduit 114. The auxiliary condensers 100 and 100A are connected to the auxiliary compressor 112 by a conduit 118 containing an expansion valve 116.

The association of the booster module with the P/C air unit constitutes a cooling apparatus having an enhanced cooling capacity. In order to increase the cooling capacity of the booster module in association with an existing P/C air unit, the blower fan 38 may replaced by a blower fan 38A having a air flow rate which is greater than the air flow rate of the blower 38.

An additional way of increasing the cooling capacity of the association of the booster module with the existing P/C air unit is to replace the condenser fans 82 and 84 with condenser fans 82A and 82A. These fans have a greater air flow rate than condenser fans 82 and 84.

Further, the invention includes the alternative of replacing fans 82 and 84 with fans 82A and 84A which are configured to permit the user the adjust the fans to achieve variable air flow rates.

As noted above fans 82A and 84A may include variably adjustable vane blades.

In yet another embodiment of the invention, as shown in FIG. 5, the blower fan 38 could be replaced with blower fan 38A together with the replacement of condenser fans 82 and 84 with fans 82A and 84A to achieve an optimal increase in cooling capability. While FIG. 5 illustrates an embodiment wherein both the blower fan and the condenser fans have been replaced, it should be understood that the invention equally includes embodiments wherein only the condenser fans or only the blower fan is replaced by a respective condenser fan means or blower fan means having a greater air flow rate capacity.

In addition to a structural apparatus, the instant invention also encompasses a method of enhancing the cooling capacity of an existing P/C air unit which includes an air inlet, a compressor, an evaporator, a condenser fan and a blower fan.

This method includes providing a booster unit 10 which includes an auxiliary compressor 112, an auxiliary evaporator 109, and an auxiliary condenser e.g. 100 and/or 100A. The booster unit 10 may also include conduit 114, 115 and 118 to interconnect the auxiliary compressor 112, the auxiliary evaporator 109 and the auxiliary condenser 100 and 100A. An expansion valve 116 may also be positioned within this conduit. The method further includes the placement of this booster module 10 at the air inlet of the P/C air unit. The method then includes the drawing of air over the auxiliary condenser 100 and 100A by means of the condenser fans 82 and 84 of the P/C air unit. In alternatives of the method, the condenser fans 82 and 84 of the P/C air unit may be replaced by condenser fans 82A and 84A having a greater air flow rate capacity. Specifically, these new condenser fans may be fitted with a means of adjusting the air flow rate. Such a means may include the use of variably pitched vane blades 86A.

In another alternative of the method, the blower fan 38 of the P/C air unit is replaced by a blower fan 38A having a greater air flow rate capacity. In a third alternative of the method, both the blower fan 38 and the condenser fans 82 and 84 are replaced respectively by a new blower fan 38A and new condenser fans 82A and 84A, each having a greater air flow rate capacity than its predecessor.

FIG. 4 illustrates a booster unit in association with a P/C air unit which has been mounted on a conventional aircraft boarding bridge 100. While this is one contemplated positioning of the booster unit and P/C air unit, it should be understood that other placements of the apparatus are also contemplated, e.g. mounting on a mobile vehicle or mounting on the airport terminal. As illustrated, the P/C air unit is fitted with a hose 101, which is shown extending downward from the P/C air unit. This hose is mounted to the outlet 46 of the plenum 44 of the P/C air unit. This hose is adapted for connection to the air inlet of an aircraft which is parked adjacent to the loading bridge and forms a structure for transferring the cooled air from the apparatus to the aircraft.

Whereas the invention is here illustrated and/or described with specific reference to an embodiment thereof presently contemplated as the best mode in carrying out such invention, it is to be understood that various changes may be made in adapting the invention to different embodiments without departing from the broad inventive concepts disclosed herein and comprehended by the claims that follow.

I claim:

1. In a preconditioned air unit for parked aircraft having an air inlet, a blower fan, a condenser, an evaporator and a condenser fan, the improvement comprising: a booster module configured mechanically to be detachably associated with said
   preconditioned air unit, said booster module having a housing, an auxiliary evaporator connected to an auxiliary condenser connected to an auxiliary compressor and a plenum; said plenum being positioned in fluid communication with said air inlet of said preconditioned air unit;
   wherein said auxiliary condenser is in fluid communication with said condenser fan of said preconditioned air unit whereby said auxiliary condenser is cooled by the operation of said condenser fan of said preconditioned air unit.

2. The improvement of claim 1 wherein said auxiliary evaporator, said auxiliary condenser, said auxiliary compressor, and said plenum are disposed within said housing and said housing is fitted with connection means for releasably connecting said housing to said preconditioned air unit.

3. The improvement of claim 1 wherein said booster module consists essentially of said housing defining an air inlet and air outlet; said auxiliary evaporator; said auxiliary compressor; said auxiliary condenser; and a conduit interconnecting said auxiliary evaporator, said auxiliary condenser, and said auxiliary compressor;
   said booster module further having control means, including an expansion valve, for operating said auxiliary evaporator, said auxiliary compressor, and said auxiliary condenser.

4. The improvement of claim 1, wherein said blower fan of said preconditioned air unit is replaced by a second blower fan having a greater air flow capacity than said blower fan.

5. The improvement of claim 1 wherein said condenser fan of said preconditioned air unit is replaced by a condenser fan means having an air flow rate capacity which is greater than that of said condenser fan of said preconditioned air unit.

6. The improvement of claim 5, wherein said condenser fan of said preconditioned air unit is replaced by a condenser fan means having an adjustable air flow rate capacity.

7. The improvement of claim 6 wherein said condenser fan means includes at least one variably adjustable vane blade.

8. The improvement of claim 1 wherein said booster module is fitted with bracket means for temporarily retaining the booster module in association with said preconditioned air unit while said preconditioned air unit is secured to said booster module.

9. A method of increasing the cooling capacity of a preconditioned air unit for parked aircraft having an air inlet, a condenser, an evaporator, a blower fan and a condenser fan, said method comprising:
   providing a booster module having a refrigerant circuit formed by an auxiliary evaporator,
   connected to an auxiliary condenser connected to an auxiliary compressor; positioning said booster module at said air inlet of said preconditioned air unit; operating said refrigerant circuit; drawing ambient air through said auxiliary condenser by means of said condenser fan of said
   preconditioned air unit; and passing air over said auxiliary evaporator and into said air inlet.

10. The method of claim 9 further including the step of replacing said blower fan of said preconditioned air unit with a second blower fan having a larger air flow capacity.

11. The method of claim 10, further including replacing said condenser fan of said preconditioned air unit with a condenser fan means having a larger air flow rate capacity than said condenser fan.

12. The method of claim 11, wherein said condenser fan means includes variable pitch vane blades further including the step of adjusting said variable pitch vane blades.

13. The method of claim 10, wherein said second blower fan includes an adjustable fan speed further including the step of adjusting the speed of said blower fan.

14. The method of claim 9, wherein said booster module consists essentially of said auxiliary evaporator, said auxiliary condenser, said auxiliary compressor and conduit interconnecting said auxiliary evaporator, said auxiliary condenser and said auxiliary compressor.

15. A method of increasing the cooling capacity of a preconditioned air unit for parked aircraft having an air inlet, a condenser, an evaporator, a blower fan and a condenser fan, said method comprising:
- providing a booster module having a refrigerant circuit formed by an auxiliary evaporator connected to an auxiliary condenser connected to an auxiliary compressor;
- positioning said booster module at air inlet of said preconditioned air unit;
- replacing said condenser fan of said preconditioned air unit with a second condenser fan having a larger air flow rate capacity;
- operating said refrigerant circuit;
- drawing ambient air through said auxiliary condenser by means of said second condenser fan; and
- passing air over said auxiliary evaporator and into said air inlet.

16. The method of claim 15, wherein said second condenser fan includes variable pitch vane blades.

17. The method of claim 16, further including the step of adjusting the pitch of said vane blades of said second condenser fan to achieve an air flow rate greater than that of said condenser fan.

18. A method of increasing the cooling capacity of preconditioned air unit for parked aircraft having an inlet, a blower fan, a condenser, an evaporator, and a condenser fan, said method comprising:
- replacing said condenser fan with a second condenser fan having a higher air flow rate capacity;
- replacing said blower fan with a second blower fan having a higher air flow rate capacity; providing a booster module having a refrigerant circuit formed by an auxiliary evaporator connected to an auxiliary condenser connected to an auxiliary compressor; positioning said booster module at said inlet of said preconditioned air unit in a sealed relationship;
- operating said refrigerant circuit; drawing air through said auxiliary condenser by means of said second condenser fan; and passing air over said auxiliary evaporator and into said inlet.

19. The method of claim 18, wherein said second condenser fan has an adjustable air flow rate capacity.

20. The method of claim 19, wherein said second condenser fan includes variable pitch vane blades.

21. The method of claim 18, wherein said booster module consists essentially of said auxiliary compressor, said auxiliary evaporator, said auxiliary condenser, conduit interconnecting said auxiliary compressor, said auxiliary evaporator and said auxiliary condenser and an expansion valve positioned in said conduit.

* * * * *